(12) United States Patent
Ohyama et al.

(10) Patent No.: US 12,501,586 B2
(45) Date of Patent: Dec. 16, 2025

(54) ELECTRONIC APPARATUS

(71) Applicant: Lenovo (Singapore) Pte. Ltd., Singapore (SG)

(72) Inventors: Atsushi Ohyama, Kanagawa (JP); Yusuke Onoue, Kanagawa (JP); Akinori Uchino, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 202 days.

(21) Appl. No.: 18/459,361

(22) Filed: Aug. 31, 2023

(65) Prior Publication Data
US 2024/0138116 A1 Apr. 25, 2024
US 2024/0237292 A9 Jul. 11, 2024

(30) Foreign Application Priority Data

Oct. 20, 2022 (JP) ................. 2022-168252

(51) Int. Cl.
*H05K 7/20* (2006.01)
*G06F 1/20* (2006.01)

(52) U.S. Cl.
CPC ......... *H05K 7/20481* (2013.01); *G06F 1/203* (2013.01)

(58) Field of Classification Search
CPC ...... G06F 1/203; G06F 1/1681; G06F 1/1616; G06F 1/1652; G06F 2200/203; G06F 2200/201; G06F 1/206; G06F 1/1641; G06F 1/1635; G06F 1/1607; G06F 1/1633; G06F 1/20; H05K 7/20336; H05K 7/2039; H05K 5/0226; H05K 7/20409; H05K 7/20154; H05K 7/20454; H05K 9/0022; H05K 5/03; H05K 7/1427; H05K 7/20381; H05K 7/20445; H05K 7/20481; H01L 23/427; H01L 23/367; H01L 23/40; H04M 1/0268; H04M 1/0214; H04M 1/0277; F28D 15/00; F28D 15/0233; F28D 15/0275; F28D 15/02; E05D 7/00; Y10T 29/24
See application file for complete search history.

(56) References Cited

U.S. PATENT DOCUMENTS 5,646,822 A * 7/1997 Bhatia ................... F28D 15/02
361/679.52
5,781,409 A * 7/1998 Mecredy, III ......... H01L 23/367
361/679.55
(Continued)

FOREIGN PATENT DOCUMENTS

JP 2014-139501 A 7/2014
JP 2014-216610 A 11/2014
(Continued)

*Primary Examiner* — Michael A Matey
(74) *Attorney, Agent, or Firm* — Osha Bergman Watanabe & Burton LLP (57) ABSTRACT

An electronic apparatus includes a CPU provided in a first chassis and generating heat, a plate-shaped vapor chamber provided in the first chassis and thermally connected to the CPU to radiate heat, and two heat pipes protruding and extending from the vapor chamber at positions separated from each other. A graphite sheet that is thinner than the vapor chamber is thermally connected to the two heat pipes. A battery device having three cells is provided in the first chassis, and the heat pipe extends into a groove portion formed between the cells.

5 Claims, 10 Drawing Sheets

(56) References Cited

U.S. PATENT DOCUMENTS

| | | | | |
|---|---|---|---|---|
| 5,796,581 | A * | 8/1998 | Mok | G06F 1/203 361/679.52 |
| 5,822,187 | A * | 10/1998 | Garner | G06F 1/203 361/679.52 |
| 6,069,791 | A * | 5/2000 | Goto | G06F 1/203 361/679.55 |
| 7,155,914 | B2 * | 1/2007 | Ishinabe | G06F 1/203 257/E23.099 |
| 10,802,555 | B2 * | 10/2020 | North | H05K 7/20336 |
| 2008/0130221 | A1 * | 6/2008 | Varadarajan | G06F 1/203 361/679.52 |
| 2018/0027694 | A1 * | 1/2018 | Uchino | G06F 1/203 361/722 |
| 2020/0081506 | A1 * | 3/2020 | Morino | G06F 1/1647 |
| 2020/0137908 | A1 * | 4/2020 | Yoo | G06F 1/1681 |
| 2020/0204666 | A1 * | 6/2020 | Hong | G06F 1/203 |
| 2020/0359530 | A1 * | 11/2020 | Uchino | G06F 1/203 |
| 2021/0011522 | A1 * | 1/2021 | Watamura | G06F 1/1681 |
| 2021/0015007 | A1 * | 1/2021 | Watanabe | G06F 1/203 |
| 2021/0337699 | A1 * | 10/2021 | Watanabe | H01L 25/105 |
| 2022/0015260 | A1 * | 1/2022 | Uchino | H05K 7/2039 |

FOREIGN PATENT DOCUMENTS

| | | |
|---|---|---|
| JP | 2015-095629 A | 5/2015 |
| JP | 2021-015522 A | 2/2021 |
| JP | 2022-078601 A | 5/2022 |

\* cited by examiner

ELECTRONIC APPARATUS

CROSS-REFERENCE TO RELATED APPLICATIONS

This application claims priority to Japanese Patent Application No. 2022-168252 filed on Oct. 20, 2022, the contents of which are hereby incorporated herein by reference in their entirety.

BACKGROUND

Technical Field

The present invention relates to an electronic apparatus having an electrical component that generates heat in a chassis.

Description of Related Art

An electronic apparatus includes a heating element such as a CPU, and it is necessary to provide heat radiation unit depending on the degree of the heat generation. Examples of the heat radiation unit include a fan, but in a thin information apparatus such as a laptop PC, a heat radiation plate such as a vapor chamber is used because a thickness of the fan is also limited and a sufficient heat radiation effect cannot be obtained. The vapor chamber is disclosed in, for example, Japanese Unexamined Patent Application Publication No. 2022-078601.

Further, in recent years, electronic apparatuses such as PCs and smartphones that have a touch panel type liquid crystal display and do not have a physical keyboard are rapidly spreading. The display of this type of electronic apparatus is desired to be large when in use, but is desired to be capable of being made smaller when not in use. Therefore, an electronic apparatus configured so that the chassis is capable of being folded by using a flexible display, for example, an organic electro luminescence (EL) or the like has been proposed (for example, refer to Japanese Unexamined Patent Application Publication No. 2021-015522).

In the electronic apparatus described in Japanese Unexamined Patent Application Publication No. 2021-015522, basically, a motherboard is provided in one chassis and a main battery is provided in the other chassis. A vapor chamber is provided in a chassis having the motherboard and radiates heat from a CPU. The area of the vapor chamber is desired to be as large as possible, but may be limited due to a layout relationship of elements other than the motherboard, for example a sub-battery or the like.

SUMMARY

The present invention has been made in consideration of the above problems in related art, and provides an electronic apparatus capable of further improving the heat radiation capacity of a heat radiation element such as a vapor chamber.

In order to solve the above-described problems and achieve an object, an electronic apparatus according to a first aspect of the present invention includes an electrical component provided in a chassis and generating heat, a plate-shaped heat radiation element provided in the chassis and thermally connected to the electrical component to radiate heat, and a plurality of heat pipes protruding and extending from the heat radiation element at positions separated from each other.

An electronic apparatus according to a second aspect of the present invention includes an electrical component provided in a chassis and generating heat, and a plate-shaped heat radiation element provided in the chassis and thermally connected to the electrical component to radiate heat, in which an edge portion of the chassis is made of a heat conductive material, and an edge of the heat radiation element is thermally connected to the edge portion.

According to the above aspects of the present invention, the heat radiation capacity of the heat radiation element can be further improved.

DETAILED DESCRIPTION

Hereinafter, an embodiment of an electronic apparatus according to the present invention will be described in detail with reference to the drawings. The present invention is not limited to this embodiment.

Figure 1:
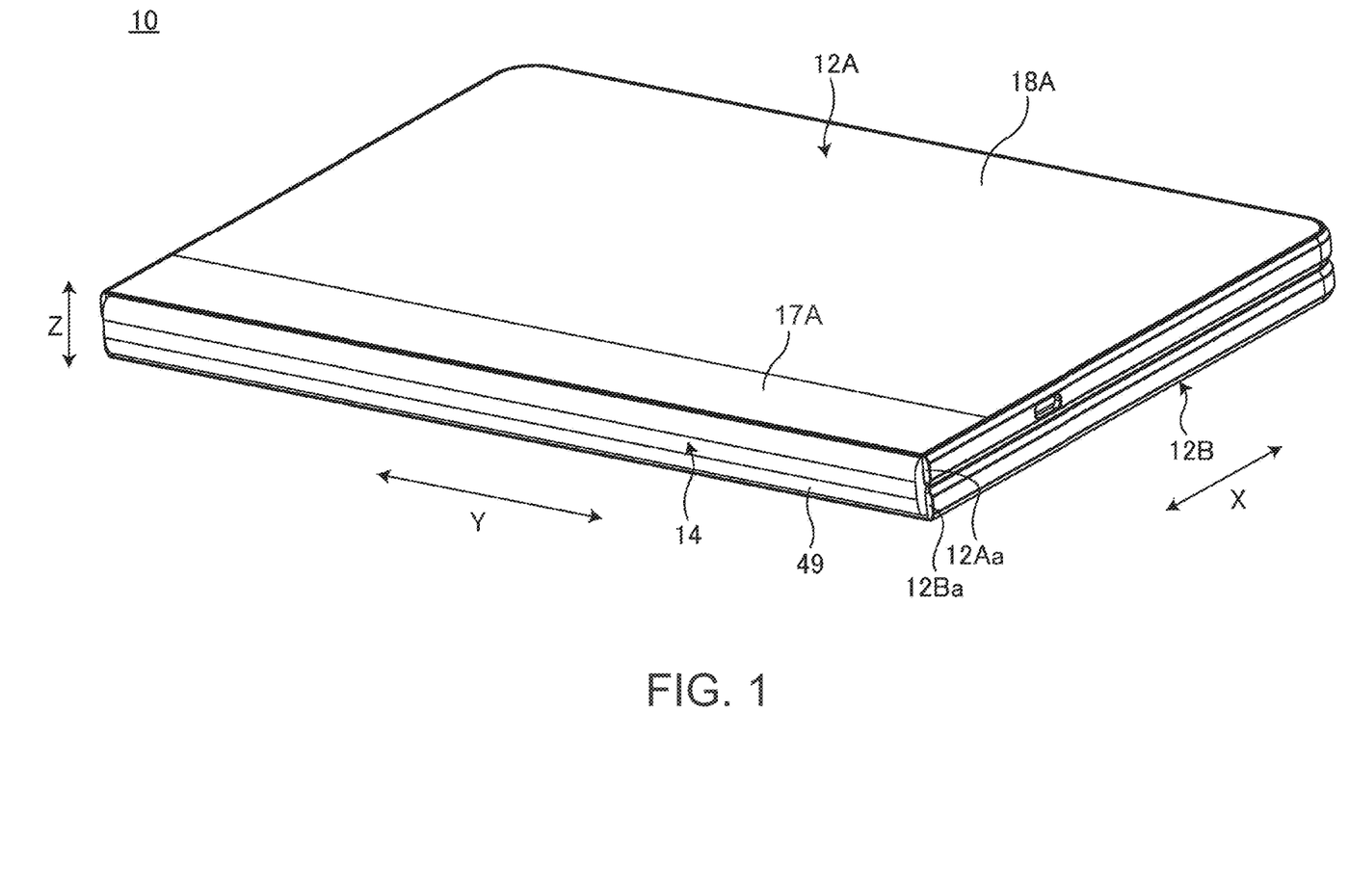
FIG. 1 is a perspective view illustrating a state in which an electronic apparatus according to an embodiment is closed and in a 0-degree posture.
Figure 2:
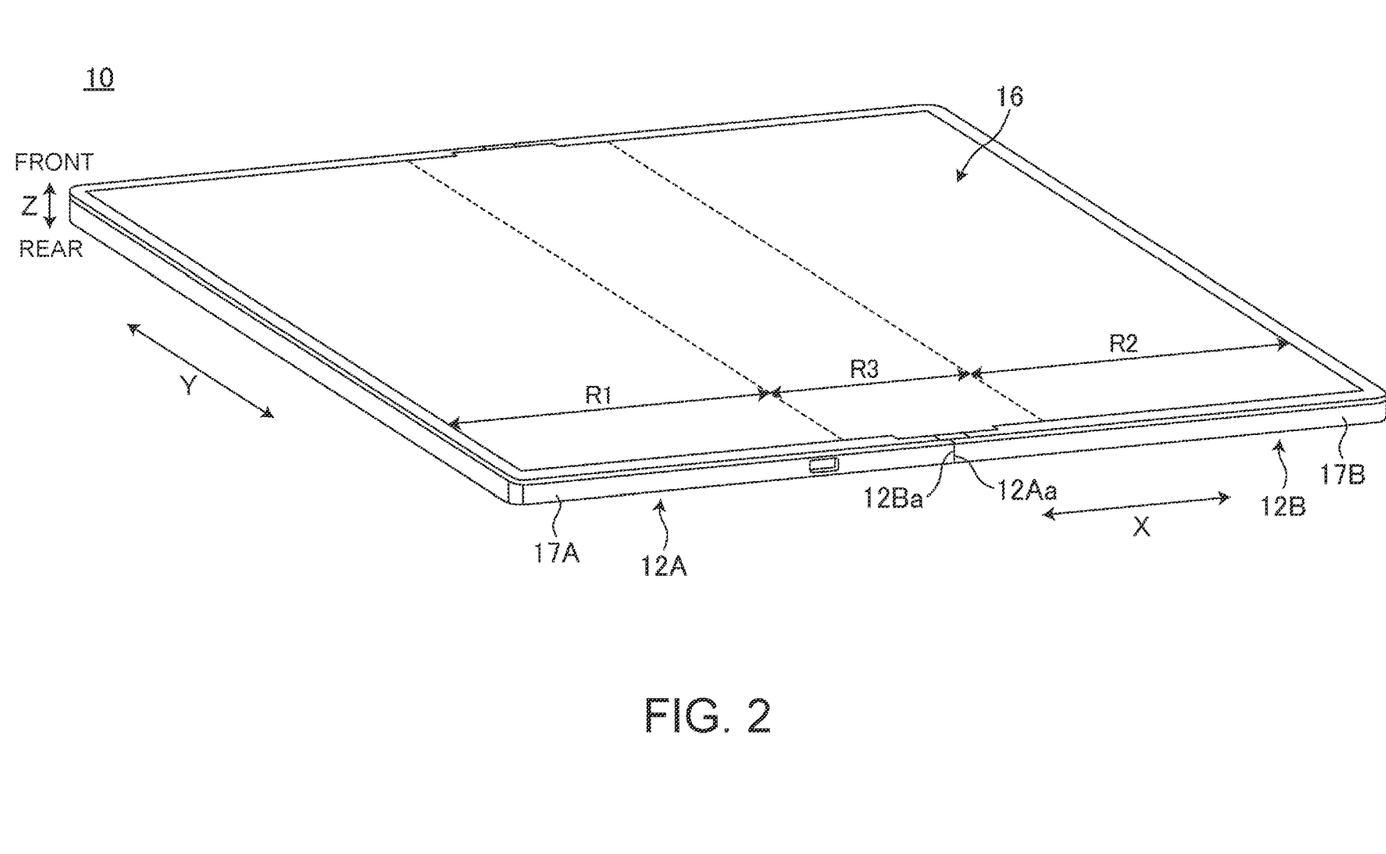
FIG. 2 is a plan view schematically illustrating a state in which the electronic apparatus is opened and in a 180-degree posture.
Figure 3:
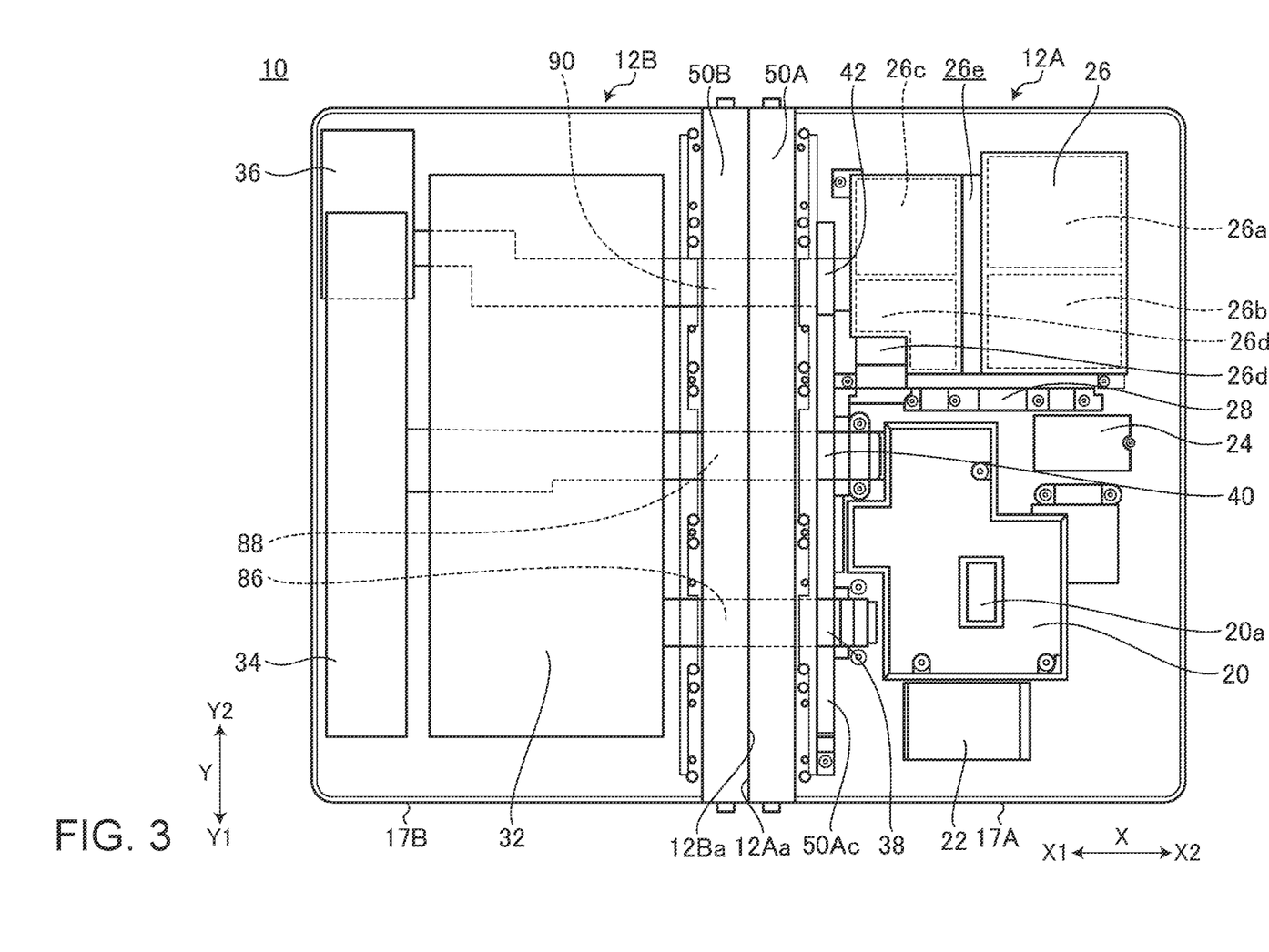
FIG. 3 is a plan view schematically illustrating an internal structure of the electronic apparatus.
Figure 4:
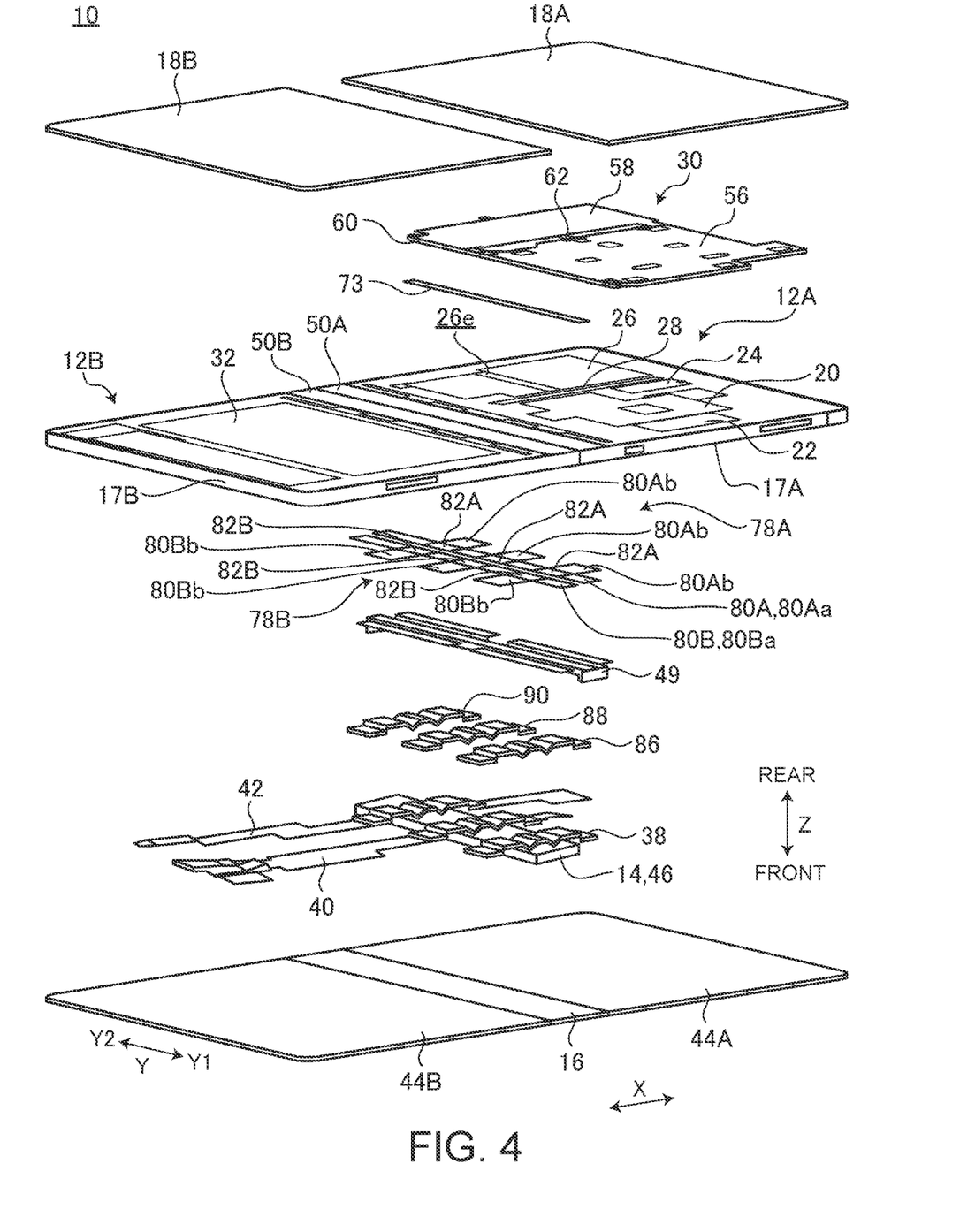
FIG. 4 is an exploded perspective view of the electronic apparatus.
Figure 5:
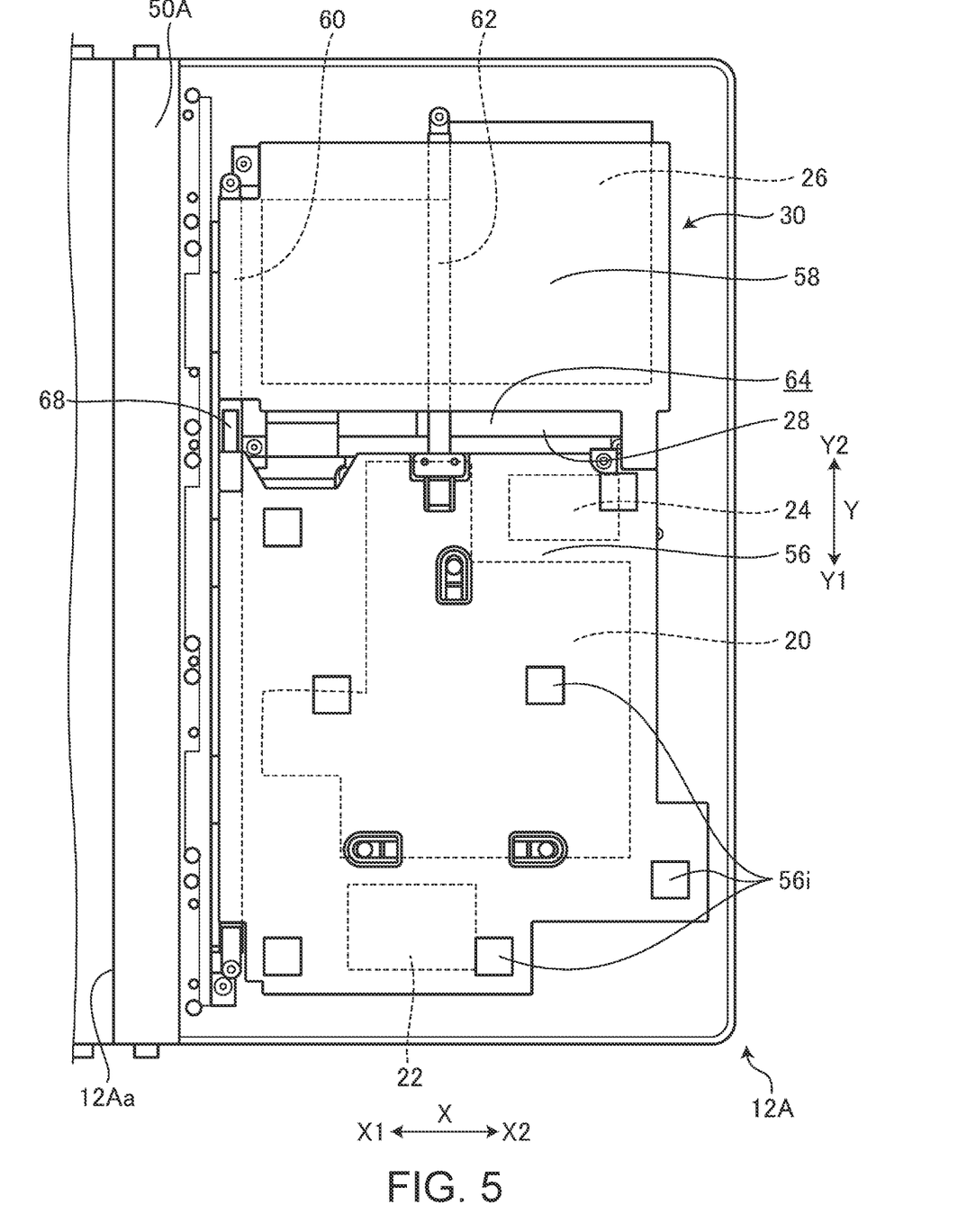
FIG. 5 is a plan view schematically illustrating an internal structure of a first chassis.
Figure 6:
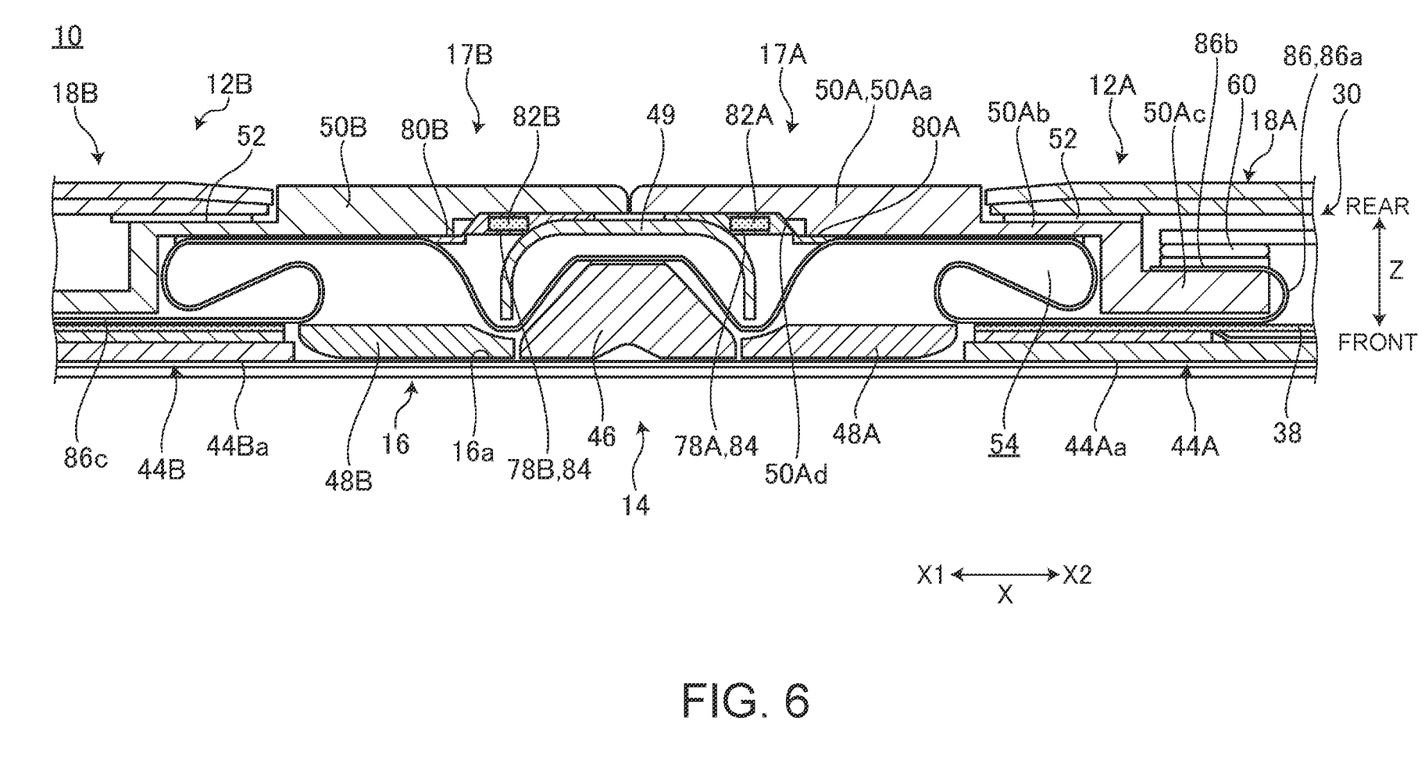
FIG. 6 is a cross-sectional side view of a hinge device and a periphery thereof in the 180-degree posture.
Figure 7:
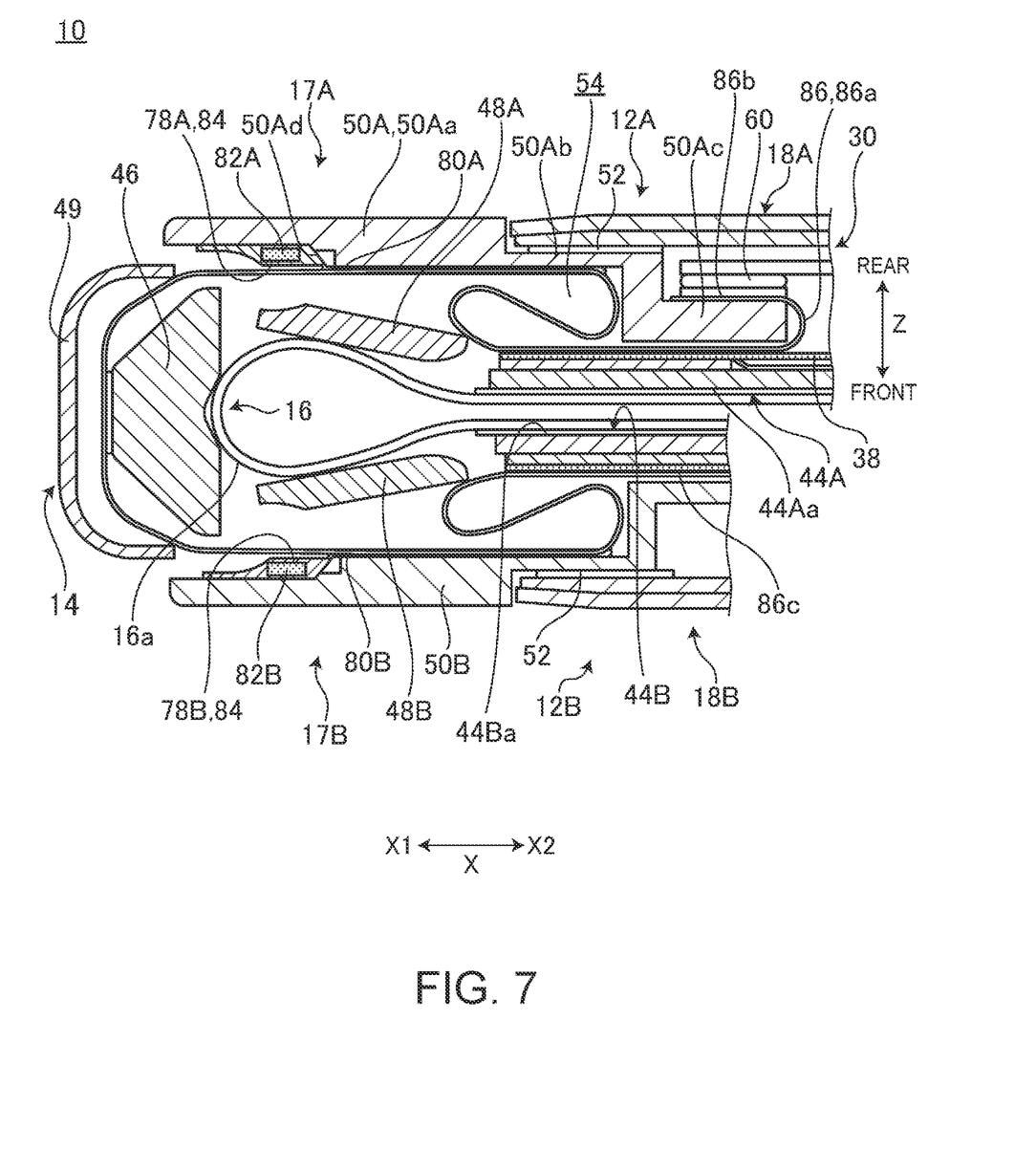
FIG. 7 is a cross-sectional side view of the hinge device and the periphery thereof in the 0-degree posture.

FIG. 1 is a perspective view illustrating a state in which an electronic apparatus 10 according to an embodiment is closed and in a 0-degree posture. FIG. 2 is a plan view schematically illustrating a state in which the electronic apparatus 10 illustrated in FIG. 1 is opened and in a 180-degree posture. FIG. 3 is a plan view schematically illustrating an internal structure of the electronic apparatus 10 illustrated in FIG. 2. In FIG. 3, cover members 18A and 18B and a thermal module 30 are in a state of being removed. FIG. 4 is an exploded perspective view of the electronic apparatus 10. FIG. 5 is a plan view schematically illustrating an internal structure of a first chassis 12A. In FIG. 5, the cover member 18A is removed, and the thermal module 30 is in a state of being attached. FIG. 6 is a cross-sectional side view of a hinge device 14 and the periphery thereof in the 180-degree posture. FIG. 7 is a cross-sectional side view of the hinge device 14 and the periphery thereof in the 0-degree posture.

As illustrated in FIGS. 1 to 4, the electronic apparatus 10 includes the first chassis 12A, a second chassis 12B, the hinge device 14, and a display 16. The display 16 extends across the chassis 12A and 12B. In the present embodiment, the electronic apparatus 10 used as a tablet PC or a laptop PC that is capable of being folded like a book is illustrated. The electronic apparatus 10 may be a smartphone, a portable game machine, or the like.

Each of the chassis 12A and 12B is disposed adjacent to each other. The first chassis 12A includes a frame member 17A and the cover member 18A. The frame member 17A is a rectangular frame-shaped member forming standing walls formed on three sides other than a first end portion 12Aa adjacent to the second chassis 12B. The cover member 18A is a plate-shaped member that closes a rear surface opening of the frame member 17A (see also FIG. 6). Similarly, the second chassis 12B includes a frame member 17B forming standing walls on three sides other than a second end portion 12Ba adjacent to the first chassis 12A, and a cover member 18B that closes a rear surface opening of the frame member 17B. Front surface openings of the frame members 17A and 17B are closed with the display 16.

Each of the members 17A, 17B, 18A, and 18B is made of, for example, a metal member such as stainless steel, magnesium, or aluminum, or a fiber-reinforced resin plate containing reinforcing fibers such as carbon fiber. That is, the members 17A, 17B, 18A, and 18B are heat conductive materials and have appropriate heat transfer properties.

The hinge device 14 connects the chassis 12A and 12B so that the chassis 12A and 12B are relatively rotatable between the 0-degree posture and the 180-degree posture. The hinge device 14 also functions as a rear cover that hides the gap between the end portions 12Aa and 12Ba formed in the 0-degree posture illustrated in FIG. 1.

Hereinafter, as for the electronic apparatus 10, description is performed while the direction in which the chassis 12A and 12B are aligned is called an X direction, the direction along the end portions 12Aa and 12Ba orthogonal to the X direction is called a Y direction, and the thickness direction of the chassis 12A and 12B is called a Z direction. In the Y direction, one side (bottom of FIG. 3) is a Y1 side, and the opposite side thereof is a Y2 side. In the Z direction, the side on which the display 16 is provided is the front surface, and the side on which the cover members 18A and 18B are provided is the rear surface. Further, only for the first chassis 12A and the constituent element thereof, the direction of the end portion 12Aa with respect to the X direction is an X1 side, and the opposite side thereof is an X2 side.

Further, as for the angular posture between the chassis 12A and 12B, description is performed while a state in which the chassis 12A and 12B are folded to overlap each other in the surface normal direction is called the 0-degree posture (see FIG. 1), and a state in which the chassis 12A and 12B are aligned in a direction perpendicular to the surface normal direction (X direction) is called the 180-degree posture (see FIG. 2 and FIG. 3). It is possible to call the posture between 0 and 180 degrees by appropriately carving the angle, and for example, a state in which the surface normal directions of the chassis 12A and 12B are orthogonal to each other is a 90-degree posture. These angles are for convenience of description, and the actual product may of course have angular positions slightly deviated from the exact angular positions indicated by angle numbers.

As illustrated in FIG. 3, the first chassis 12A is mounted with a motherboard 20, a communication module 22, a solid state drive (SSD) 24, and a battery device 26. A stay 28 extending in the X direction is provided on the Y2 side slightly from the center in FIG. 3 with respect to the Y direction. The stay 28 is a portion of the first chassis 12A or is a component fixed to the first chassis 12A. Further, the thermal module 30 (see FIG. 4) is provided in the first chassis 12A. The thermal module 30 will be described later.

The stay 28 is used for fixing the cover member 18A. The motherboard 20, the communication module 22, and the SSD 24 are mounted on the Y1 side from the stay 28. A portion of the motherboard 20 and the SSD 24 are adjacent to the stay 28. The communication module 22 is mounted on the Y1 side from the motherboard 20. The battery device 26 is mounted on the Y2 side from the stay 28. The battery device 26 is adjacent to the stay 28.

An electronic component such as a central processing unit (CPU) 20a, for example, is mounted on the motherboard 20. The CPU 20a is a processing device that performs computing related to primary control or processing of the electronic apparatus 10. The CPU 20a is one of the largest heating elements among the electronic components mounted on the electronic apparatus 10. The communication module 22 performs information processing on wireless communication transmitted and received, for example, via the antenna mounted on the second chassis 12B. The communication module 22 corresponds to, for example, a wireless WAN or a 5th generation mobile communication system. The SSD 24 is a storage device that uses a semiconductor memory. Various electronic components other than the motherboard 20 are mounted on the first chassis 12A. The communication module 22 and the SSD 24 are heating elements having the heat generation amount second only to the CPU 20a.

The battery device 26 is a secondary battery that serves as a sub power source for the electronic apparatus 10. The battery device 26 has three cells 26a, 26b, and 26c, and a control unit 26d. The cells 26a and 26b are provided on the X2 side, and the cell 26c and the control unit 26d are provided on the X1 side. The cell 26a and the control unit 26d are adjacent to the stay 28. The cell 26a and the cell 26b are parallel to each other in the Y direction. The cell 26c and the control unit 26d are parallel to each other in the Y direction. A groove portion 26e is formed between the cells 26a and 26b, and the cell 26c and the control unit 26d. The cells 26a, 26b, and 26c are formed to be sufficiently thick in the Z direction in the first chassis 12A to increase the capacity, but the gap with the cover member 18A is narrow. However, the groove portion 26e has an appropriate gap between the groove portion 26e and the cover member 18A. The control unit 26d is provided with an electrode portion 26da that performs input and output of electric power.

A battery device 32, a display board 34, and a sub card 36 are mounted on the second chassis 12B. The battery device 32 is a secondary battery that serves as the main power source of the electronic apparatus 10, is larger than the battery device 26, and occupies most of the second chassis 12B. The display board 34 is a control board of the display 16. The sub card 36 is a board on which, for example, a power button, an external connector conforming to a universal serial bus (USB) standard, or the like is mounted. Various electronic components other than the battery device 32 or the like are mounted on the second chassis 12B.

The battery device 32, the display board 34, and the sub card 36 are connected to the motherboard 20 by using respective flexible boards 38, 40, and 42, which straddle the end portions 12Aa and 12Ba. Hereinafter, the flexible boards 38, 40, and 42 will also be typically referred to as the flexible board 38 when distinction is not necessary.

The heat generation amount of the battery device 32, the display board 34, and the sub card 36 is smaller than that of the CPU 20a or the like. Therefore, in the electronic apparatus 10, the heat generation amount in the first chassis 12A is larger than the heat generation amount in the second chassis 12B. Therefore, the electronic apparatus 10 includes heat conductive members 78A and 78B (see FIG. 4) and graphite sheets 86, 88, and 90 (see FIG. 4) as a configuration for promoting heat transfer between the left and right chassis 12A and 12B and equalizing the heat of each of the chassis 12A and 12B. The graphite sheets 86, 88, and 90 are laminated and bonded to portions of the flexible boards 38, 40, and 42 in this order. The heat conductive members 78A and 78B and the graphite sheets 86, 88, and 90 will be described later.

In the 0-degree posture illustrated in FIGS. 1 and 7, the chassis 12A and 12B are in a state of being folded in half. The display 16 is a paper-shaped flexible display formed of an organic EL. In the 0-degree posture, the display 16 is disposed so that a region R1 on the side of the first chassis 12A and a region R2 on the side of the second chassis 12B illustrated in FIG. 2 face each other, and a bending region R3 which is a boundary region between the regions R1 and R2 is bent in an arc shape. In the 180-degree posture illustrated in FIGS. 2 and 6, the chassis 12A and 12B are disposed side by side with each other. At this time, the display 16 has the regions R1 and R2 and the bending region R3 disposed side by side on a XY plane, and forms a flat plate shape as a whole.

In the display 16, the region R1 is relatively fixed with respect to the first chassis 12A, and the region R2 is relatively fixed with respect to the second chassis 12B. Specifically, as illustrated in FIG. 6, a rear surface 16a of the region R1 is fixed to the first chassis 12A via a first plate 44A, and the rear surface 16a of the region R2 is fixed to the second chassis 12B via a second plate 44B.

As illustrated in FIG. 6, the plates 44A and 44B are disposed on left and right to interpose the hinge device 14 therebetween, and support the display 16 in respective front surfaces 44Aa and 44Ba. The rear surface 16a of the display 16 has the region R1 adhesively fixed to the front surface 44Aa of the first plate 44A and the region R2 adhesively fixed to the front surface 44Ba of the second plate 44B. The plates 44A and 44B have, for example, a configuration to include a carbon fiber reinforced resin plate in which carbon fibers are impregnated with a matrix resin such as epoxy resin, and a metal frame made of a magnesium alloy surrounding an outer periphery of the rear surface of the carbon fiber reinforced resin plate.

The bending region R3 of the display 16 is relatively movable with respect to the chassis 12A and 12B. In the 180-degree posture, the rear surface 16a of the bending region R3 is supported by the hinge device 14 (see FIG. 6). In the 0-degree posture, the bending region R3 is bent in an arc shape, a portion of the rear surface 16a is supported by the hinge device 14, and most of the rear surface 16a is separated from the hinge device 14 (see FIG. 7).

As illustrated in FIGS. 6 and 7, the hinge device 14 of the present embodiment has a hinge main body 46, a first support plate 48A, and a second support plate 48B.

The hinge main body 46 is provided at a position straddling the end portions 12Aa and 12Ba of the chassis 12A and 12B, and extends over the substantially entire length in the Y direction along the end portions 12Aa and 12Ba. The hinge main body 46 is a block-shaped component formed of a metal material such as aluminum. The hinge main body 46 supports two hinge shafts aligned in the X direction in the 180-degree posture.

As illustrated in FIGS. 1 and 6, a rear cover component 49 is attached to the outer surface of the hinge main body 46. The rear cover component 49 is a substantially U-shaped plate that matches the outer surface shape of the hinge main body 46. The rear cover component 49 is formed of a heat conductive material, for example, an aluminum alloy, stainless steel, or the like. The rear cover component 49 is a decorative cover to improve the outer surface quality. The flexible boards 38, 40, and 42 pass between the hinge main body 46 and the rear cover component 49 at a position straddling the end portions 12Aa and 12Ba.

In the 180-degree posture illustrated in FIG. 6, the hinge main body 46 is accommodated in the chassis 12A and 12B, and straddles the end portions 12Aa and 12Ba close to each other in the X direction. In the 0-degree posture illustrated in FIG. 7, the hinge main body 46 is disposed to close a gap formed between the end portions 12Aa and 12Ba that are largely separated from each other. At this time, deterioration of an appearance design of the folded electronic apparatus 10 is prevented by disposing the rear cover component 49 to the outermost surface (see FIG. 1).

That is, the rear cover component 49 covers the gap formed between the chassis 12A and 12B in an angular posture other than 180 degrees (for example, the 0-degree posture or the 90-degree posture) (see FIGS. 1 and 7). As a result, the rear cover component 49 prevents the internal component of the chassis 12A and 12B from being exposed to the appearance from the gap. The rear cover component 49 is disposed to straddle the end portions 12Aa and 12Ba close to each other in the X direction in the 180-degree posture, and is accommodated in the chassis 12A and 12B (see FIG. 6).

For example, when the hinge main body 46 is not configured to extend in the Y direction as illustrated in FIG. 3, but is configured with one or a plurality of small piece components, the rear cover component 49 may be supported by each of the chassis 12A and 12B separately from the hinge device 14. That is, the rear cover component 49 may not necessarily be a constituent element of the hinge device 14, and in short, when the gap between the end portions 12Aa and 12Ba can be covered in an angular posture other than 180 degrees, the configuration and attachment mode are not limited. However, in the present embodiment, the rear cover component 49 is a configuration component of the hinge device 14, so that an individual configuration or mechanism to attach the rear cover component 49 to the chassis 12A and 12B is unnecessary, and the configuration can be simplified.

The support plates 48A and 48B are plates formed of a metal material such as aluminum, and have bilaterally symmetrical shapes. The support plates 48A and 48B are provided on the front sides of the chassis 12A and 12B, and extend over the substantially entire length in the Y direction along the end portions 12Aa and 12Ba.

The first support plate 48A is disposed between the first plate 44A and the hinge main body 46. The first support plate 48A has an edge portion on the side of the first plate 44A, which is connected to a predetermined bracket to be relatively rotatable via a rotation shaft. The first support plate 48A has an edge portion on the side of the hinge main body 46, which is relatively movable with respect to the hinge main body 46. Since the configuration, attachment structure, or the like of the second support plate 48B are bilaterally symmetrical with those of the first support plate 48A, detailed description thereof will be omitted.

The support plates 48A and 48B swing according to the rotation operation of the chassis 12A and 12B. In the 180-degree posture, the support plates 48A and 48B support the rear surface 16a of the bending region R3 of the display 16 by the front surfaces of the support plates 48A and 48B.

In the angular postures other than 180 degrees, the support plates 48A and 48B come into contact with the display 16 in a state in which a gap is provided between the support plates 48A and 48B and the display 16 or with a slight force that does not deform the display 16 (see FIG. 7). The support plates 48A and 48B may be configured to support the bending region R3 of the display 16 even in an angular posture other than 180 degrees and to correct the shape of the bending region R3. As described above, in the 180-degree posture, the support plates 48A and 48B stably support the bending region R3 of the display 16 in a plane, and do not hinder the bending operation of the bending region R3.

A connection edge portion (first edge portion) 50A along the end portion 12Aa of the frame member 17A will be described. The connection edge portion 50A is substantially symmetrical in the X direction with and adjacent to a connection edge portion 50B along the end portion 12Ba of the frame member 17B in the 180-degree posture (see FIG. 6). Further, the connection edge portion 50A and the connection edge portion 50B are substantially symmetrical in the Z direction and face each other in the 0-degree posture (see FIG. 7). Since the connection edge portion 50A and the connection edge portion 50B have substantially symmetrical shapes, only the connection edge portion 50A will be described.

The connection edge portion 50A is a portion of the frame member 17A and has an appropriate heat transfer property as described above. The connection edge portion 50A has a rear surface forming portion 50Aa, a middle stage portion 50Ab, and a low stage portion 50Ac. The rear surface forming portion 50Aa is a portion that forms the rear surface of the first chassis 12A in a region from the end portion of the cover member 18A to the end portion 12Aa of the first chassis 12A. A low step portion 50Ad is formed on an inner surface on the X1 side of the rear surface forming portion 50Aa.

The middle stage portion 50Ab is a portion extending from the rear surface forming portion 50Aa to the X2 side. The cover member 18A is fixed to the middle stage portion 50Ab by an adhesive tape 52. There is a step between the rear surface forming portion 50Aa and the middle stage portion 50Ab, and the rear surface forming portion 50Aa and the cover member 18A may form substantially the same surface.

The low stage portion 50Ac is a portion that slightly shifts from the middle stage portion 50Ab to the front surface side and further extends to the X2 side. A portion of the thermal module 30 is fixed to the low stage portion 50Ac, as will be described later. Space 54 is formed on the front surface side of the middle stage portion 50Ab in FIG. 6 and on the X1 side of the low stage portion 50Ac. A portion of the flexible board 38 is accommodated in the space 54 to draw an inverted S shape. Further, there is a similar space at a symmetrical position in the second chassis 12B, and a portion of the flexible board 38 is accommodated to draw an S shape. As a result, the flexible board 38 reasonably follows the deformation of the electronic apparatus 10 from the 0-degree posture to the 180-degree posture.

Figure 8:
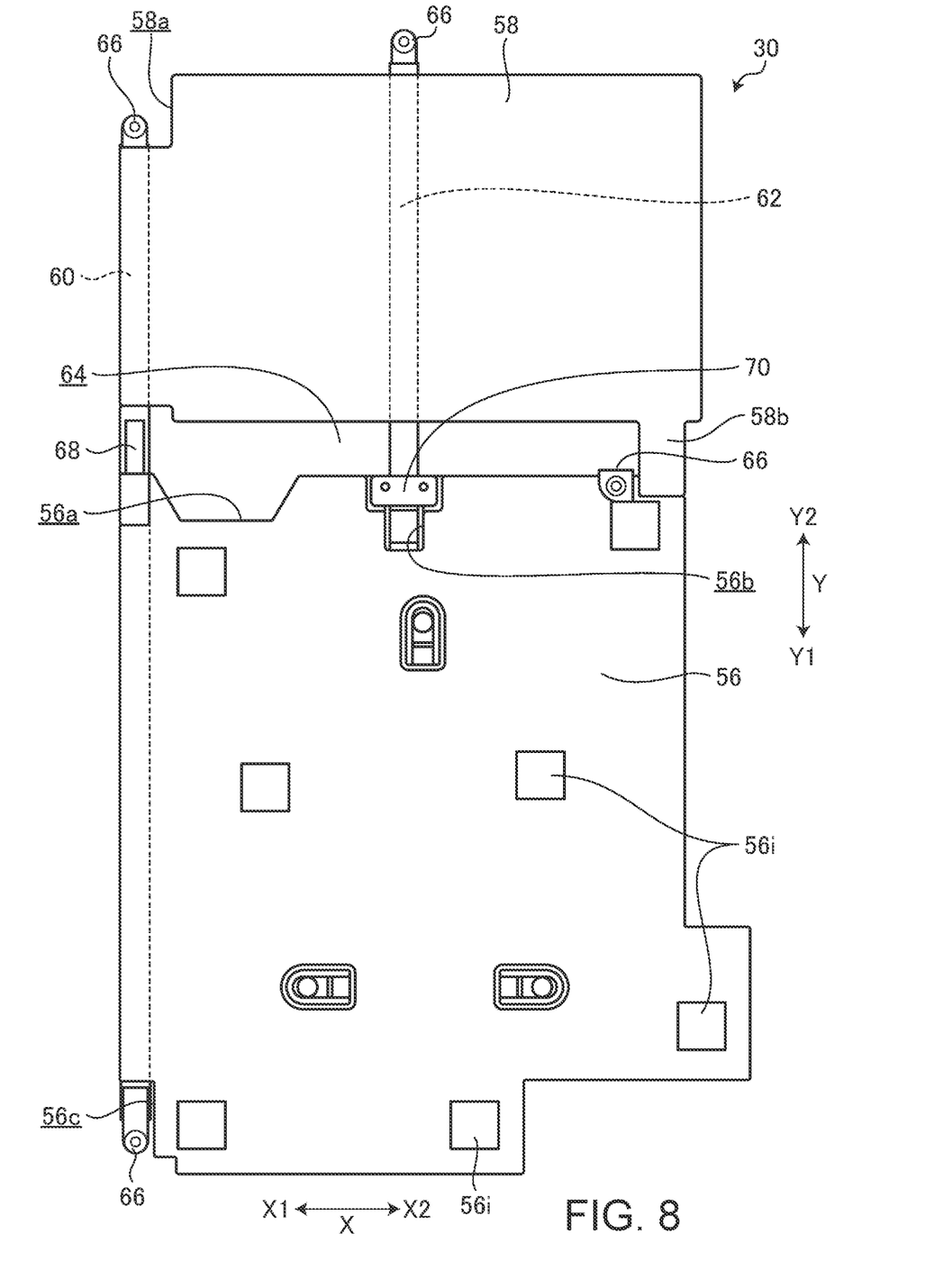
FIG. 8 is a plan view illustrating a rear surface of a thermal module.
Figure 9:
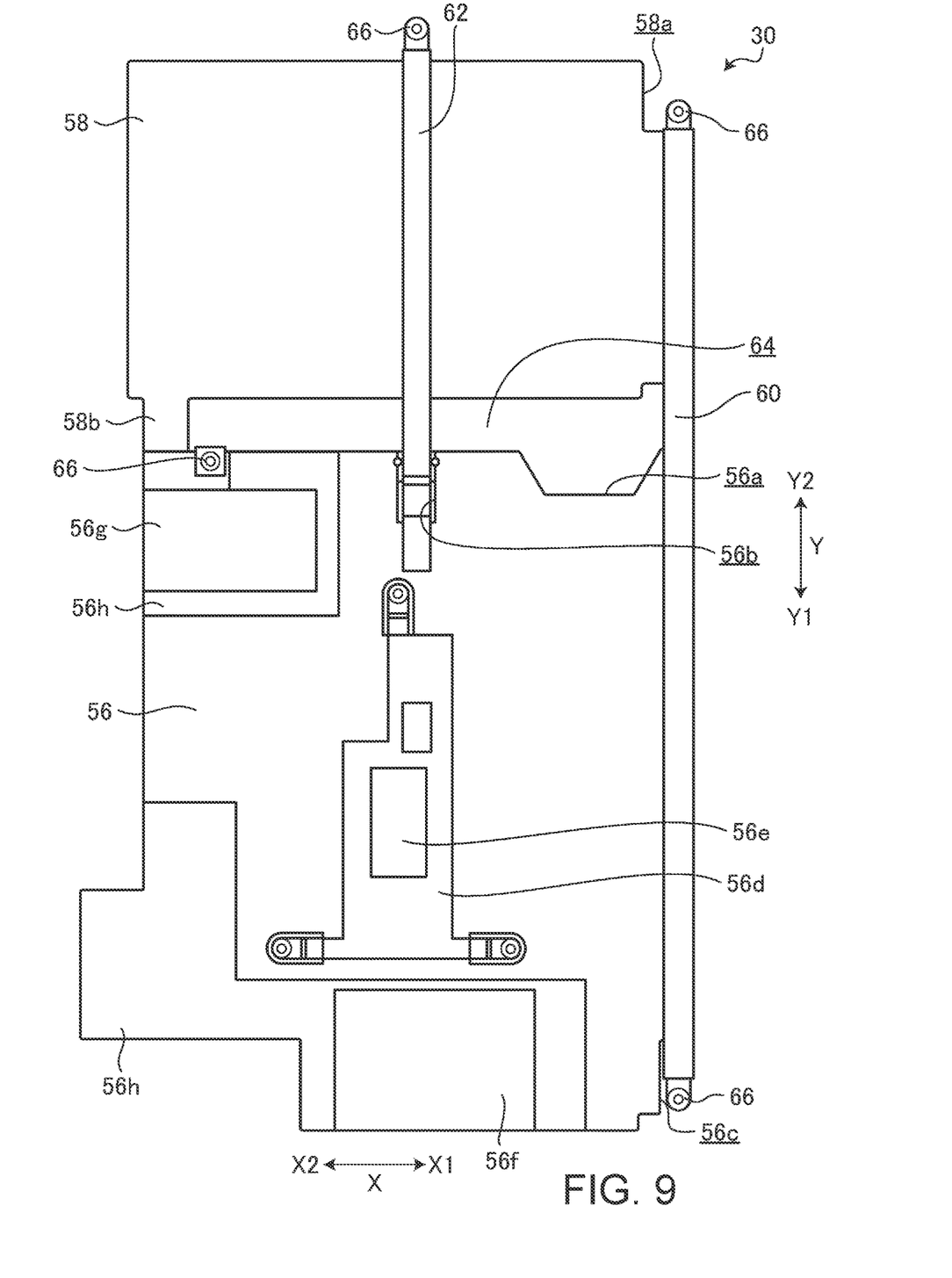
FIG. 9 is a plan view illustrating a front surface of the thermal module.

Next, the thermal module 30 will be described. FIG. 8 is a plan view illustrating a rear surface of the thermal module 30. FIG. 9 is a plan view illustrating a front surface of the thermal module 30.

As illustrated in FIGS. 8 and 9, the thermal module 30 has a vapor chamber (heat radiation element) 56, a graphite sheet (heat conductive sheet) 58, and two heat pipes 60 and 62. The thermal module 30 is a heat radiation element that receives heat from the CPU 20a, the communication module 22, and the SSD 24, which are electrical components that generate heat, and diffuses the heat to a wide range to radiate heat.

The vapor chamber 56 is a plate-shaped heat transfer device. In the vapor chamber 56, a closed space is formed between two thin metal plates, and working fluid is enclosed in the closed space. The metal plate is made of a metal with high heat conductivity, such as aluminum, copper, or stainless steel. The closed space is a flow path through which the enclosed working fluid flows while creating a phase change. Examples of the working fluid include water, CFC substitutes, acetone, butane, or the like. A wick that delivers the condensed working fluid by a capillary phenomenon is disposed in the closed space. The wick is made of, for example, a porous body, such as a mesh obtained by knitting a fine metal wire into a cotton shape, a fine flow path, or the like. The vapor chamber 56 is thin, but is thicker than the graphite sheet 58.

The vapor chamber 56 covers most of the region on the Y1 side from the stay 28, including the motherboard 20, the communication module 22, and the SSD 24, in the first chassis 12A (see FIG. 5). Although the vapor chamber 56 is substantially rectangular, a notch portion 56a is formed at an end on the X1 side and the Y2 side, a notch portion 56b is formed at a substantially center on the Y2 side, a notch portion 56c is formed at the head at an end on the X1 side and the Y1 side, and some projection portions are formed on the layout. The notch portion 56a is a trapezoid slightly wide in the X direction. The notch portion 56b is a rectangular shape having a narrow width in the X direction. The notch portions 56a and 56b are open to a gap 64 between the vapor chamber 56 and the graphite sheet 58. An elastic plate 56d, which is fixed at three points and slightly displaceable, and three heat receiving plates 56e, 56f, and 56g are provided on the front surface of the vapor chamber 56 (see FIG. 9).

The heat receiving plate 56e is fixed to the elastic plate 56d, and is elastically pressed against and reliably abuts against the CPU 20a by the action of the elastic plate 56d. The heat receiving plate 56e is substantially in the center of the vapor chamber 56. The heat receiving plate 56f is fixed in the vicinity of an end portion of the vapor chamber 56 on the Y1 side, and abuts on the communication module 22. The heat receiving plate 56g is fixed in the vicinity of an end portion of the vapor chamber 56 on the Y2 side and the X2 side, and abuts on the SSD 24. The heat receiving plates 56e to 56g may be coated with heat transfer grease. The heat receiving plates 56e to 56g may be omitted.

A reference numeral 56h in FIG. 9 is an auxiliary graphite sheet that is attached. The graphite sheet 56h is made of the same material as the graphite sheet 58. A plurality of thin sponges 56i is dispersed and provided on the rear surface of the vapor chamber 56 (see FIG. 8). A screw fixing portion 66 is provided in the vicinity of an end portion of the vapor chamber 56 on the X2 side and the Y2 side. In addition to these, the thermal module 30 includes a plurality of screw fixing portions 66, and is screw-fixed to the first chassis 12A by using the screw fixing portions 66. The thermal module 30 is attachable to and detachable from the first chassis 12A.

The graphite sheet 58 is formed by processing graphite, which is an homogenic of carbon, into a sheet shape and has high heat conductivity. The graphite sheet 58 is a thin and flexible sheet and has a thickness of, for example, approximately 10 μm to 1 mm. The graphite sheet 58 may be replaced with, for example, a metal sheet such as an aluminum foil or a copper foil. The same applies to the graphite sheets 80A, 80B, 86, 88, and 90 which will be described later.

A graphite sheet 58 covers most of the battery device 26 (see FIG. 5) in a region on the Y2 side from the stay 28 in the first chassis 12A. The graphite sheet 58 is disposed in parallel with the vapor chamber 56 in the Y direction via the gap 64. The graphite sheet 58 and the vapor chamber 56 have substantially the same width in the X direction. The area of the graphite sheet 58 is substantially half that of the vapor chamber 56. Although the graphite sheet 58 is substantially rectangular, the notch portion 58a is formed at an end on the X1 side and the Y2 side, and a projection portion 58b is formed at an end on the X2 side and the Y1 side. The projection portion 58b is fixed to the vapor chamber 56.

The heat pipe 60 is a pipe-shaped heat transfer device. The heat pipe 60 is formed by crushing a metal pipe thinly and flatly into an elliptical cross section shape, and a working fluid is enclosed in a closed space formed in the metal pipe. The metal pipe is made of a metal with high heat conductivity, such as aluminum, copper, or stainless steel. The closed space is a flow path through which the enclosed working fluid flows while creating a phase change. Examples of the working fluid include water, CFC substitutes, acetone, butane, or the like. A wick that delivers the condensed working fluid by a capillary phenomenon is disposed in the closed space. The wick is made of, for example, a porous body, such as a mesh obtained by knitting a fine metal wire into a cotton shape, a fine flow path, or the like. The heat pipe 62 has the same basic configuration as the heat pipe 60 described above, except that the length and the path are different.

The heat pipe 60 is provided along the Y direction over the entire length of the vapor chamber 56 and the graphite sheet 58 via the gap 64 at the end portion of the thermal module 30 on the X1 side. The heat pipe 60 is long and is slightly shorter than the dimension of the first chassis 12A in the Y direction. The heat pipe 60 is fixed to the front surface of the vapor chamber 56 by welding or the like and fixed to the front surface of the graphite sheet 58 with a heat-transferable adhesive tape or the like, and thermal connection is made to each case.

The heat pipe 60 protrudes from the vapor chamber 56 to the notch portion 56c on the Y1 side, and a screw fixing portion 66 is provided at the tip thereof. The heat pipe 60 protrudes from the graphite sheet 58 to the notch portion 58a on the Y2 side, and a screw fixing portion 66 is provided at the tip thereof. A thin spacer 68 is provided at the portion of the gap 64 in the heat pipe 60 on the side of the rear surface (see FIG. 8).

The heat pipe 62 is provided along the Y direction over the vapor chamber 56 and the graphite sheet 58 via the gap 64 at the substantially center of the thermal module 30 in the X direction. That is, the heat pipe 60 and the heat pipe 62 are parallel to each other and are appropriately separated from each other. The length of the heat pipe 62 is about half that of the heat pipe 60. The heat pipe 62 is fixed to the front surface of the vapor chamber 56 by welding or the like and fixed to the front surface of the graphite sheet 58 with a heat-transferable adhesive tape or the like, and thermal connection is made to each case.

The heat pipe 62 is fitted into the notch portion 56b of the vapor chamber 56 on the Y1 side, and a relatively short portion on the side of the tip thereof is fixed to the vapor chamber 56. The heat pipe 62 and the vapor chamber 56 are auxiliary fixed by a metal fitting 70 crossing the notch portion 56b. The elastic plate 56d and the heat receiving plate 56e are on the extension of the heat pipe 62 in the Y1 direction, but the extension does not reach to a position in which they overlap. That is, the heat pipe 62 is disposed not to overlap the CPU 20a in plan view, and the thickness of the first chassis 12A in the Z direction can be reduced at a portion of the CPU 20a. The heat pipe 62 protrudes from the graphite sheet 58 on the Y2 side, and the screw fixing portion 66 is provided at the tip thereof.

The thermal module 30 has the two heat pipes 60 and 62 that protrude and extend from the vapor chamber 56, and thus each of the two heat pipes 60 and 62 can independently transfer heat from the vapor chamber 56, and the heat radiation capacity can be further improved because only at least a portion protruding from the vapor chamber 56 has an increased area. Further, since the heat pipes 60 and 62 are provided at positions separated from each other, the bias of heat in the vapor chamber 56 can be further suppressed, and the heat radiation performance of the vapor chamber 56 can be improved.

Furthermore, since the edge of the vapor chamber 56 is thermally connected to the low stage portion 50Ac, the connection edge portion 50A also exerts a heat radiation effect, and thus the heat radiation capacity can be further improved. In particular, since the edge of the vapor chamber 56 is thermally connected to the low stage portion 50Ac via the heat pipes 60 and 62, the bias of heat is not present in the Y direction, and the heat is transferred more effectively.

Although the thermal module 30 of the present embodiment has the two heat pipes 60 and 62, three or more heat pipes that are separated from each other may be provided depending on the design conditions. The heat pipe 60 and the heat pipe 62 may be non-parallel depending on the design conditions.

Further, since the two heat pipes 60 and 62 are thermally connected to the graphite sheet 58 from the vapor chamber 56, the heat can be effectively transferred from the vapor chamber 56 to the graphite sheet 58, so that the heat radiation effect is enhanced. Since the graphite sheet 58 is thinner than the vapor chamber 56, the graphite sheet 58 can be disposed in a narrow space between the battery device 26 and the cover member 18A. Since the two heat pipes 60 and 62 are fixed to the graphite sheet 58 over the entire length in the Y direction, the graphite sheet 58 does not exhibit loosening, bending, wrinkling, or the like at least in the range, and is easily attached to the first chassis 12A. Further, since the graphite sheet 58 is fixed to the vapor chamber 56 by the projection portion 58b, the end portion on the X2 side is also less likely to exhibit loosening, bending, wrinkling, or the like. It is preferable that the two heat pipes 60 and 62 are connected to the graphite sheet 58, but a reasonable heat transfer effect can be obtained when at least one of a plurality of heat pipes is connected.

The stay 28 is exposed to the gap 64 between the vapor chamber 56 and the graphite sheet 58, and is fixed to the cover member 18A by an adhesive tape or the like. The electrode portion 26da of the battery device 26 is exposed at the notch portion 56a of the vapor chamber 56 in the gap 64. Therefore, when the thermal module 30 is removed from the first chassis 12A during repair or maintenance, the electrode portion 26da is operated prior to the removal to electrically cut off the battery device 26 and other constituent elements thereof, so that a short circuit due to a tool or the like can be prevented.

The heat pipe 62 is provided to extend into the groove portion 26e between the cells 26a and 26b, and the cell 26c and the control unit 26d. Since the groove portion 26e has an appropriate gap with the cover member 18A, the heat pipe 62 does not interfere with the cover member 18A. Further, for the positions of the cells 26a to 26c, it is sufficient when the gap with the cover member 18A is larger than the thickness of the graphite sheet 58, and the charging capacity can be improved. The heat pipe 62 is accurately positioned by being fitted into the groove portion 26e, and the assembly of the thermal module 30 is facilitated.

Figure 10:
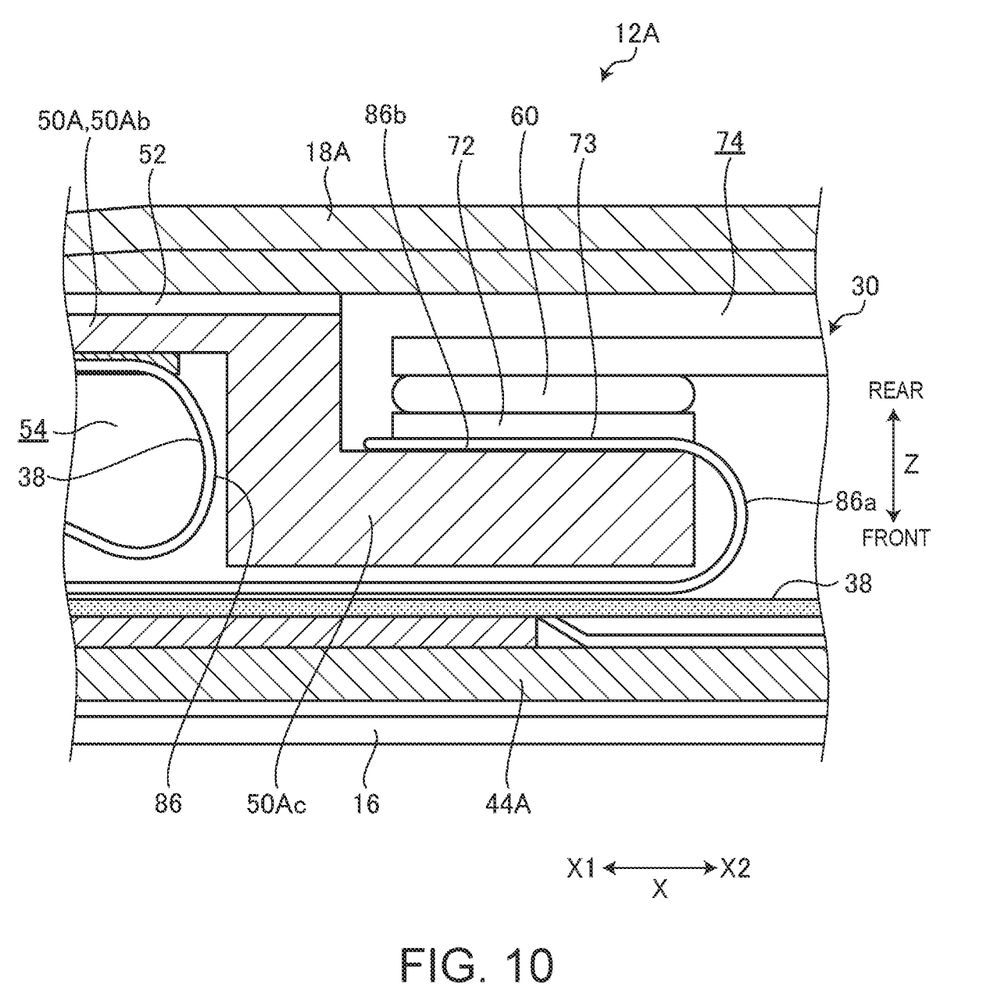
FIG. 10 is a schematic cross-sectional side view of a portion in which a frame member and the thermal module are thermally connected.

FIG. 10 is a schematic cross-sectional side view of a portion in which the frame member 17A and the thermal module 30 are thermally connected. As illustrated in FIGS. 5 and 10, the heat pipe 60 is provided along the connection edge portion 50A and is thermally connected to the low stage portion 50Ac of the connection edge portion 50A. Specifically, the front surface of the heat pipe 60 abuts on the rear surface of the low stage portion 50Ac via a heat transfer rubber 72 and a graphite sheet 73 (see FIG. 4) over the entire length. The graphite sheet 73 has an elongated shape corresponding to the heat pipe 60. Each spacing among the heat pipe 60, the heat transfer rubber 72, and the graphite sheet 73 may be fixed with a heat-transferable tape or the like. Depending on the conditions, the heat transfer rubber 72 and the graphite sheet 73 may be omitted.

Both ends of the heat pipe 60 are fixed by the screw fixing portion 66, and the spacer 68 is provided at a substantially central portion, so that the heat pipe 60 reliably abuts against the low stage portion 50Ac without floating. A general heat pipe is used for heat transfer from one end to the other end, but the heat pipe 60 transfers heat from the vapor chamber 56 and the graphite sheet 58 to the frame member 17A over the entire length. In the present embodiment, the heat pipe 60 abuts only on the connection edge portion 50A among the four edges of the frame member 17A in the first chassis 12A, but the heat pipe 60 may be formed into an L-shape or a U-shape and may abut against two or three edges.

Further, basically, between the thermal module 30 and the cover member 18A, the gap 74 is formed by the sponge 56i or the like, and there is no heat transfer between the thermal module 30 and the cover member 18A. This is because, when the cover member 18A is thermally connected to the thermal module 30, the portion thereof becomes a hotspot and gives a sense of discomfort to the user.

As illustrated in FIGS. 4 and 6, the electronic apparatus 10 includes the first heat conductive member 78A provided in the first chassis 12A and a second heat conductive member 78B provided in the second chassis 12B. The first heat conductive member 78A has the first graphite sheet 80A and a first cushion member 82A. The second heat conductive member 78B has the second graphite sheet 80B and a second cushion member 82B. The heat conductive members 78A and 78B are disposed to be substantially bilaterally symmetrical. The graphite sheets 80A and 80B may be replaced with sheet-shape members formed of a heat conductive material such as a copper sheet or an aluminum sheet.

As illustrated in FIG. 4, the graphite sheets 80A and 80B have first sheets 80Aa and 80Ba extending in the Y direction and three second sheets 80Ab and 80Bb protruding in the X direction to be orthogonal to the first sheets 80Aa and 80Ba. The first sheet 80Aa extends along the end portion 12Aa, and the first sheet 80Ba extends along the end portion 12Ba. The second sheet 80Ab and the second sheet 80Bb protrude in opposite directions.

The cushion members 82A and 82B are formed of a material having flexibility and a certain degree of repulsive force, such as rubber and sponge. The cushion members 82A and 82B of the present embodiment are sponges. The cushion members 82A and 82B have greater thicknesses than the graphite sheets 80A and 80B in the Z direction, and are, for example, about 1 to 2 mm in thickness. The cushion members 82A and 82B are disposed at three intersections between the first sheet 80Aa and 80Ba, and the second sheet 80Ab and 80Bb, respectively. As a result, in the heat conductive members 78A and 78B, a bank-shaped bulging portion 84 in which the graphite sheets 80A and 80B are raised is formed at each position at which the cushion members 82A and 82B are disposed.

The first graphite sheet 80A is attached to the front surface side of the rear surface forming portion 50Aa and the middle stage portion 50Ab of the connection edge portion 50A. The first cushion member 82A and the bulging portion 84 corresponding to the first cushion member 82A are disposed at the step portion 50Ad. The second graphite sheet 80B and the second cushion member 82B are provided at positions that are substantially symmetrical with the first graphite sheet 80A and the first cushion member 82A in the connection edge portion 50B.

As illustrated in FIG. 6, the cushion members 82A and 82B press the graphite sheets 80A and 80B against the rear cover component 49 in the 180-degree posture. Therefore, the heat conductive members 78A and 78B are in contact with the rear cover component 49 at a portion at which the bulging portion 84 is provided. As a result, the first frame member 17A is thermally connected to the second frame member 17B via the first graphite sheet 80A, the rear cover component 49, and the second graphite sheet 80B, and thermal transfer is performed between the first chassis 12A and the second chassis 12B. When the bulging portion 84 abuts on a shoulder portion of the rear cover component 49 and the electronic apparatus 10 is deformed from 0 degrees to 180 degrees, a sliding distance with respect to the rear cover component 49 is short, and the front surface of the rear cover component 49 does not deteriorate. As illustrated in FIG. 7, the graphite sheets 80A and 80B are separated from the rear cover component 49 in the 0-degree posture and are not visible to the user.

Next, the graphite sheets (heat conductive sheets) 86, 88, and 90 will be described. As described above, the graphite sheets 86, 88, and 90 are laminated on the flexible boards 38, 40, and 42 in this order at least at a position extending from the first chassis 12A to the second chassis 12B, and are attached by a heat-transferable adhesive tape or the like. Hereinafter, the graphite sheet 86 and the flexible board 38, which are typically attached to each other, will be described. The graphite sheet 86 is made of, for example, the same material as the graphite sheet 58 described above. The graphite sheet 86 has a strip shape and has the same width as the flexible board 38 in the X direction.

As illustrated in FIG. 6, since the graphite sheet 86 and the flexible board 38 are laminated at a position extending from the first chassis 12A to the second chassis 12B, the same management path is provided. Therefore, accommodation is made to draw an S shape and an inverted S shape in the space 54 of the first chassis 12A and the corresponding space of the second chassis 12B. Further, since the graphite sheet 86 and the flexible board 38 are disposed in the path between the rear cover component 49 and the hinge device 14, the rear surface side is covered with the rear cover component 49 and is not visible. Further, the front surface side is covered with the display 16.

The graphite sheet 86 and the flexible board 38 extend from the space 54 in the first chassis 12A to a gap between the low stage portion 50Ac of the connection edge portion 50A and the display 16 in the X2 direction. The flexible board 38 passing through the gap is connected to the motherboard 20. On the other hand, in the graphite sheet 86, a U-shaped folded portion 86a is formed, and one end portion 86b reaches the rear surface of the low stage portion 50Ac and is laminated, interposed, and thermally connected between the low stage portion 50Ac and the heat pipe 60 via the heat transfer rubber 72. That is, one end portion 86b of the graphite sheet 86 is thermally connected to the thermal module 30 and the connection edge portion 50A. In this example, one end portion 86b of the graphite sheet 86 is thermally connected by being interposed between the heat pipe 60 and the low stage portion 50Ac, but as long as the state of the thermal connection is maintained, the laminating order does not matter, and the laminating order may be changed, for example, by changing the path of the graphite sheet 86 or the like.

Further, the graphite sheet 86 is disposed in the second chassis 12B substantially symmetrically with the first chassis 12A together with the flexible board 38, and the other end portion 86c of the graphite sheet 86 is thermally connected to the frame member 17B and the connection edge portion 50B that is a portion thereof or the like. Therefore, the heat of the heating element such as the CPU 20a is transferred from the thermal module 30 to the heat pipe 60 that is an end portion thereof, and is further transferred to the one end portion 86b laminated and interposed between the heat pipe 60 and the low stage portion 50Ac, and thermal transfer is performed from the first chassis 12A to the second chassis 12B by the graphite sheet 86.

Further, as described above, the heat of the heat pipe 60 is transferred from the low stage portion 50Ac to the connection edge portion 50A, the first heat conductive member 78A, the rear cover component 49, the second heat conductive member 78B, and the connection edge portion 50B. Due to these actions, in the electronic apparatus 10, the temperature balance between the first chassis 12A and the second chassis 12B can be adjusted. In the first chassis 12A, the temperature rise is appropriately suppressed, so that other cooling units such as a fan can be omitted. By omitting the mechanical operation elements such as a fan, the cost can be reduced, the noise can be reduced, and the thickness can be reduced.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 10 electronic apparatus
12A first chassis
12B second chassis
14 hinge device
17A, 17B frame member
18A, 18B cover member
20 motherboard
20a CPU (electrical component)
26, 32 battery device
26a, 26b, 26c cell
26da electrode portion
26e groove portion
28 stay
30 thermal module
38, 40, 42 flexible board
49 rear cover component
50A connection edge portion (edge portion)
50Aa rear surface forming portion
50Ab middle stage portion
50Ac low stage portion
56 vapor chamber (heat radiation element)
58 graphite sheet (heat conductive sheet)
60, 62 heat pipe
64 gap
86, 88, 90 graphite sheet
86a folded portion
86b one end portion

What is claimed is:

1. An electronic apparatus comprising:
an electrical component provided in a chassis and generating heat;
a plate-shaped heat radiation element provided in the chassis and thermally connected to the electrical component to radiate heat; and a plurality of heat pipes protruding and extending from the heat radiation element at positions separated from each other,
wherein an edge portion of the chassis is made of a heat conductive material,
in the heat radiation element, one of the plurality of heat pipes is provided along the edge portion and is thermally connected to the edge portion,
a battery configured with a plurality of cells is provided in the chassis, and
one of the plurality of heat pipes extends into a groove portion formed between the plurality of cells.

2. The electronic apparatus according to claim 1, wherein a heat conductive sheet thinner than the heat radiation element is thermally connected to at least one of the plurality of heat pipes.

3. An electronic apparatus comprising: an electrical component provided in a chassis and generating heat; a plate-shaped heat radiation element provided in the chassis and thermally connected to the electrical component to radiate heat; and a plurality of heat pipes protruding and extending from the heat radiation element at positions separated from each other, wherein a battery configured with a plurality of cells is provided in the chassis, one of the plurality of heat pipes extends into a groove portion formed between the plurality of cells, the plurality of heat pipes is thermally connected to a heat conductive sheet thinner than the heat radiation element, and a gap is provided between the heat conductive sheet and the heat radiation element to expose an electrode portion of the battery.

4. The electronic apparatus according to claim 1, wherein the plurality of heat pipes is disposed not to overlap the electrical component in plan view.

5. The electronic apparatus according to claim 2, wherein the heat conductive sheet is a graphite sheet or a metal sheet.

* * * * *